United States Patent [19]
Bechade

[11] Patent Number: 6,108,678
[45] Date of Patent: Aug. 22, 2000

[54] METHOD AND APPARATUS TO DETECT A FLOATING POINT MANTISSA OF ALL ZEROS OR ALL ONES

[75] Inventor: Roland A. Bechade, Summerville, N.J.

[73] Assignee: Mentor Graphics Corporation, Wilsonville, Oreg.

[21] Appl. No.: 09/073,041

[22] Filed: May 5, 1998

[51] Int. Cl.[7] .............................. G06F 5/01; G06F 11/08
[52] U.S. Cl. .................. 708/205; 708/530; 708/211; 704/213; 704/224
[58] Field of Search .................................. 708/706, 211, 708/525, 530, 685, 205; 395/500.19, 500.06, 500.08; 341/50, 79, 59; 704/220, 220.21, 213, 208, 224; 360/53

[56] References Cited

U.S. PATENT DOCUMENTS

| | | | |
|---|---|---|---|
| 5,241,490 | 8/1993 | Poon | 708/205 |
| 5,561,619 | 10/1996 | Watanabe et al. | 708/525 |
| 5,566,079 | 10/1996 | Jun et al. | 395/500.19 |

*Primary Examiner*—Daniel H. Pan
*Attorney, Agent, or Firm*—Blakely, Sokoloff Taylor & Zafman, LLP

[57] ABSTRACT

A method to detect a normalized data field of all zeros or all ones includes receiving a control field and a data field, dividing the data field into segments, and performing detections on each segment. Each segment undergoes all zeros detection, all ones detection, modified zeros detection, and modified ones detection. The modified zeros detection and modified ones detection are both done based on the control field. Each detection for each segment generates a response. Then, a pair of the four responses, or a clear responses signal, is selected for each of the segments based on the control field. From the selected responses, the method determines if the normalized data field is all zeros or all ones.

18 Claims, 11 Drawing Sheets

| SHIFTCNTL | DATA | | | |
|---|---|---|---|---|
| 3 2 1 0 | 15 14 13 12 | 11 10 9 8 | 7 6 4 5 | 3 2 1 0 |
| 0 0 0 0 | X X X X | X X X X | X X X X | X X X X |
| 0 0 0 1 |   X X X | X X X X | X X X X | X X X X |
| 0 0 1 0 |     X X | X X X X | X X X X | X X X X |
| 0 0 1 1 |       X | X X X X | X X X X | X X X X |
| 0 1 0 0 |         | X X X X | X X X X | X X X X |
| 0 1 0 1 |         |   X X X | X X X X | X X X X |
| 0 1 1 0 |         |     X X | X X X X | X X X X |
| 0 1 1 1 |         |       X | X X X X | X X X X |
| 1 0 0 0 |         |         | X X X X | X X X X |
| 1 0 0 1 |         |         |   X X X | X X X X |
| 1 0 1 0 |         |         |     X X | X X X X |
| 1 0 1 1 |         |         |       X | X X X X |
| 1 1 0 0 |         |         |         | X X X X |
| 1 1 0 1 |         |         |         |   X X X |
| 1 1 1 0 |         |         |         |     X X |
| 1 1 1 1 |         |         |         |       X |

TABLE 1

| SHIFTCNTL 3 SHIFTCNTL 2 | DATA 3-0 | | DATA 7-4 | | DATA 11-8 | | DATA 15-12 | |
|---|---|---|---|---|---|---|---|---|
|  | SEL | CLEAR | SEL | CLEAR | SEL | CLEAR | SEL | CLEAR |
| 0 0 | 0 | 1 | 0 | 1 | 0 | 1 | 1 | 1 |
| 0 1 | 0 | 1 | 0 | 1 | 1 | 1 | Z | 0 |
| 1 0 | 0 | 1 | 1 | 1 | Z | 0 | Z | 0 |
| 1 1 | 1 | 1 | Z | 0 | Z | 0 | Z | 0 |

TABLE 4

CLEAR = 1   PASS EITHER
CLEAR = 0   ODS = ZDS = 1
SEL = 1     PASS MODIFIED
SEL = 0     PASS NORMAL

FIG. 9B

| SHIFTCNTL 1, SHIFTCNTL 0 | ZDM |
|---|---|
| 0 0 | DATA 0´ |
| 0 1 | DATA 1 NOR DATA 0 |
| 1 0 | ( DATA 2 OR DATA 1 OR DATA 0 )´ |
| 1 1 | ( DATA 3 OR DATA 2 OR DATA 1 OR DATA 0 )´ |

TABLE 2

| SHIFTCNTL 1, SHIFTCNTL 0 | ODM |
|---|---|
| 0 0 | DATA 0 |
| 0 1 | DATA 1 AND DATA 0 |
| 1 0 | DATA 2 AND DATA 1 AND DATA 0 |
| 1 1 | DATA 3 AND DATA 2 AND DATA 1 AND DATA 0 |

TABLE 3

METHOD AND APPARATUS TO DETECT A FLOATING POINT MANTISSA OF ALL ZEROS OR ALL ONES

FIELD OF THE INVENTION

The present invention pertains to the field of digital data processing. More particularly, this invention relates to a method and apparatus for detecting a floating point mantissa of all zeros or all ones.

BACKGROUND OF THE INVENTION

Floating point notation is widely used in digital data processing to represent a much larger range of numbers than can be represented in regular binary notation. Various types of floating point notations are used. Typically, a floating point number has a sign bit (s), followed by an exponent field (e) and a mantissa or significand field (fff). Usually, the sign bit, exponent, and mantissa are applied to a formula such as:

$$\text{Value} = (-1)^S \times (1.fff_2) \times 2^e.$$

A normalized floating point number has a one to the left of the decimal point in the mantissa.

A floating point unit (FPU) is used to perform arithmetic operations on floating point numbers, such as addition, subtraction, multiplication, and division. After an arithmetic operation, the most significant one in the result may not be in the most significant bit position. For instance, if two close numbers are subtracted, the result may have one or more leading ones or zeros. Therefore, in order to normalize the floating point number, the number must be left shifted until the first one in the result is in the left most position in the mantissa.

Normalizing a result after an arithmetic operation often introduces a significant time delay. Normalization typically involves scanning the mantissa of a result for the most significant one and encoding the number of bit positions the mantissa needs to be left shifted. The code is usually provided to a shifter to left shift the mantissa.

The normalized mantissa must also be analyzed for all zeros or all ones. That is, a mantissa of all zeros or all ones requires special consideration. For instance, an arithmetic result may have a normalized mantissa of all zeros indicating a floating point zero. A floating point zero, however, is typically a reserved state in which the mantissa and exponent bits are all zeros.

A mantissa of all ones is another special circumstance. For instance, an overflow error may occur if the mantissa is rounded. That is, if a mantissa of all ones is rounded up, all of the bits of the mantissa will transition to zero and a carry out will be generated. In which case, the exponent must be incremented in order to represent the number. If the exponent becomes all ones after being incremented, then the number becomes infinity.

Many typical FPUs detect zeros and ones after a mantissa has been left shifted. In which case, the delay for the left shifting is combined with the delay for the detection. In order to increase computational performance, a need exists for an improved method and apparatus to test a normalized mantissa for all zeros or all ones.

SUMMARY OF THE INVENTION

A method to detect a normalized data field of all zeros or all ones includes receiving a control field and a data field, dividing the data field into segments, and performing detections on each segment. Each segment undergoes all zeros detection, all ones detection, modified zeros detection, and modified ones detection. The modified zeros detection and modified ones detection are both done based on the control field. Each detection for each segment generates a response. Then, a pair of the four responses, or a clear responses signal, is selected for each of the segments based on the control field. From the selected responses, the method determines if the normalized data field is all zeros or all ones.

BRIEF DESCRIPTION OF THE DRAWINGS

Examples of the present invention are illustrated in the accompanying drawings. The accompanying drawings, however, do not limit the scope of the present invention whatsoever. Like references in the drawings indicate similar elements.

DETAILED DESCRIPTION

In the following description, numerous specific details are set forth in order to provide a thorough understanding of the present invention. However, those skilled in the art will understand that the present invention may be practiced without these specific details. In other instances well known methods, procedures, components, and circuits have not been described in detail.

Figure 1:
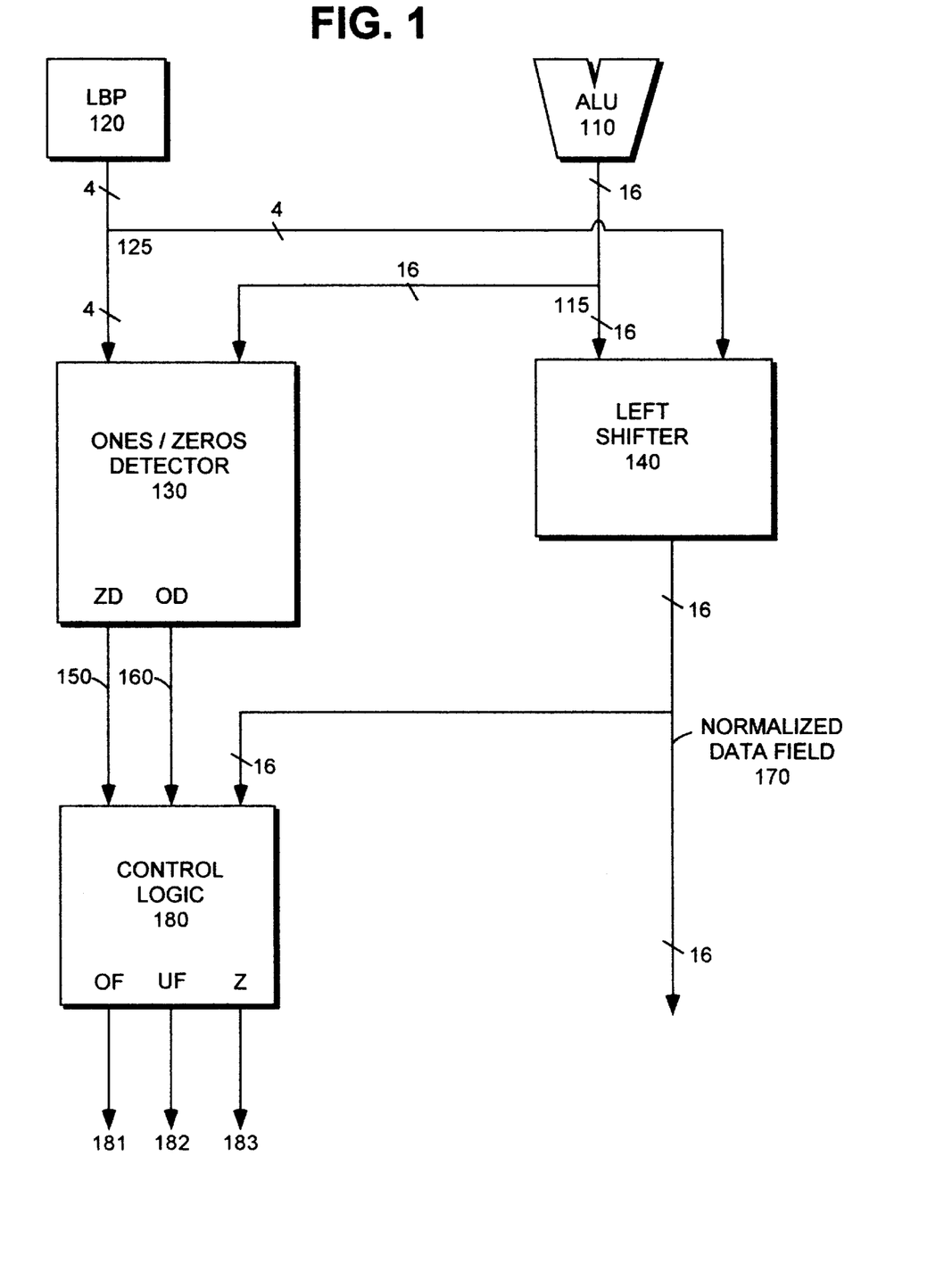
FIG. 1 illustrates an example of an apparatus to normalize the mantissa of a floating point number.

FIG. 1 illustrates one embodiment of an apparatus to normalize a mantissa of a floating point number and to detect a normalized mantissa of all zeros or all ones as implemented, for instance, in a floating point unit (FPU). An example of such an FPU may be found in copending U.S. patent application titled "An Improved Floating Point Unit Equipped also to Perform Integer Addition as well as Floating Point to Integer Conversion," Ser. No. 09/072,774, having the same assignee, and hereby incorporated by reference.

The apparatus of FIG. 1 includes leading bit predictor (LBP) 120, ones/zeros detector 130, left shifter 140, and control logic 180, which are coupled to arithmetic logic unit (ALU) 110 as shown. Unlike the prior art, ones/zeros detector 130 is not coupled in series with left shifter 140. Instead, ones/zeros detector 130 is in parallel with left shifter 140. That is, rather than operating on the normalized data field produced by left shifter 140, ones/zeros detector 130 operates on the pre-normalized data field to accurately predict if the normalized data field will be all zeros or all ones. Thus, the series delay is avoided.

In the illustrated embodiment, ALU 110 provides a 16 bit data field to detector 130 and left shifter 140 in parallel over bus 115. The 16 bit data field is the result of an arithmetic operation performed by ALU 110. LBP 120 predicts if the data field needs to be normalized by predicting the position of the most significant one in the result. If left shifting is needed, LBP 120 encodes the number of shifts into a control field. LBP 120 represents any one of a number of digital encoders. As shown, the control field is four bits wide in order to accommodate the 16 bit data field, wherein zero to 15 bit position shifts can be encoded.

LBP 120 provides the control field to detector 130 and left shifter 140 over bus 125. Left shifter 140 beings to left shift the 16 bit data field as many times as indicated by the control field. Left shifter 140 represent any one of a number of shifting devices, such as a barrel shifter.

Detector 130 works in parallel with left shifter 140. As discussed below, detector 130 operates on the pre-normalized data field to identify the special cases in which the normalized data field will be all zeros or all ones. Using the control field, detector 130 analyzes only the part of the pre-normalized data field that will be in the normalized data. If detector 130 detects a normalized data filed of all zeros, the zero detect signal, ZD, is asserted on line 150. If all ones are detected, the ones detect signal, OD, is asserted on line 160. Based on ZD and OD, control logic 180 takes appropriate action. For instance, control logic 180 may assert overflow 181, underflow 182, or zero output 183.

Figure 2:
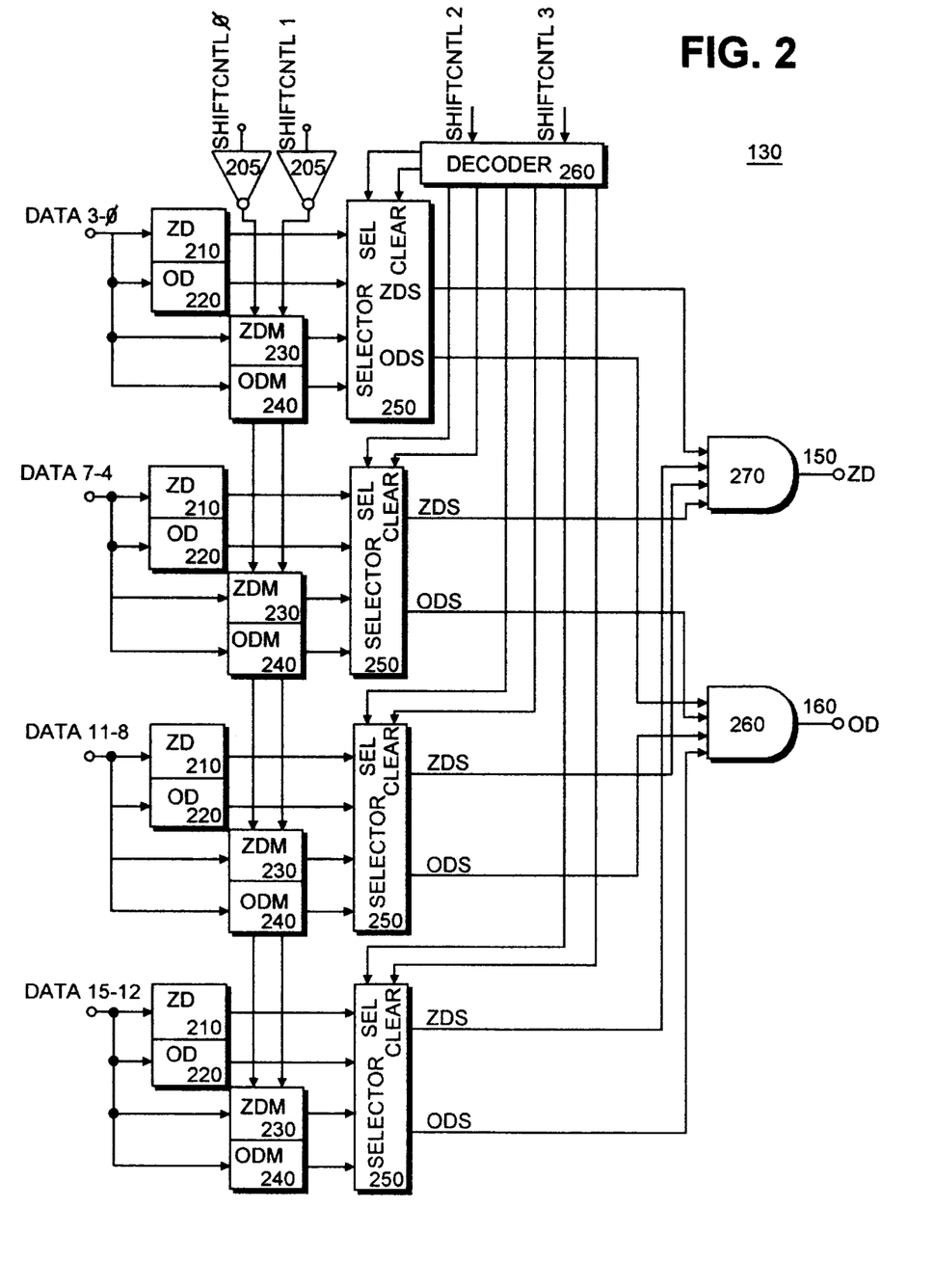
FIG. 2 illustrates one embodiment of the present invention used in the apparatus of FIG. 1.

FIG. 2 illustrates one embodiment of detector 130 in more detail. The 16 bit data field is divided up into four segments, from the most significant, DATA 15–12, to the least significant, DATA 3–0. Each segment is four bits wide. Four operations are performed on each segment in parallel by a zeros detect unit 210, a ones detect unit 220, a modified zeros detect unit 230, and a modified ones detect unit 240. As discussed below, detectors 210 and 220 indicate whether or not an entire segment is all zeros or all ones respectively. Modified detectors 230 and 240 indicate whether or not a portion of a segment is all zeros or all ones respectively, wherein the portion to be examined is determined based on the low order bits of the control field, SHIFTCNTL 1 and 0.

All four indications for each segment are provided to a selector 250. As discussed below, based on the high order bits of the control field, SHIFTCNTL 3 and 2, decoder 260 instructs the selectors 250 to pass indications only for segments or portions of segments that will be in the normalized data field. Each selector 250 provides a zeros detect signal, ZDS, and a ones detect signal, ODS, by selecting pairs of indications from detectors 210 and 220, or detectors 230 and 240, or by clearing both outputs. The ZDS and ODS signals are ANDed together by AND gates 270 and 260 respectively to produce the ZD and OD signals which are passed to control logic 180, as discussed above.

Figure 9A:
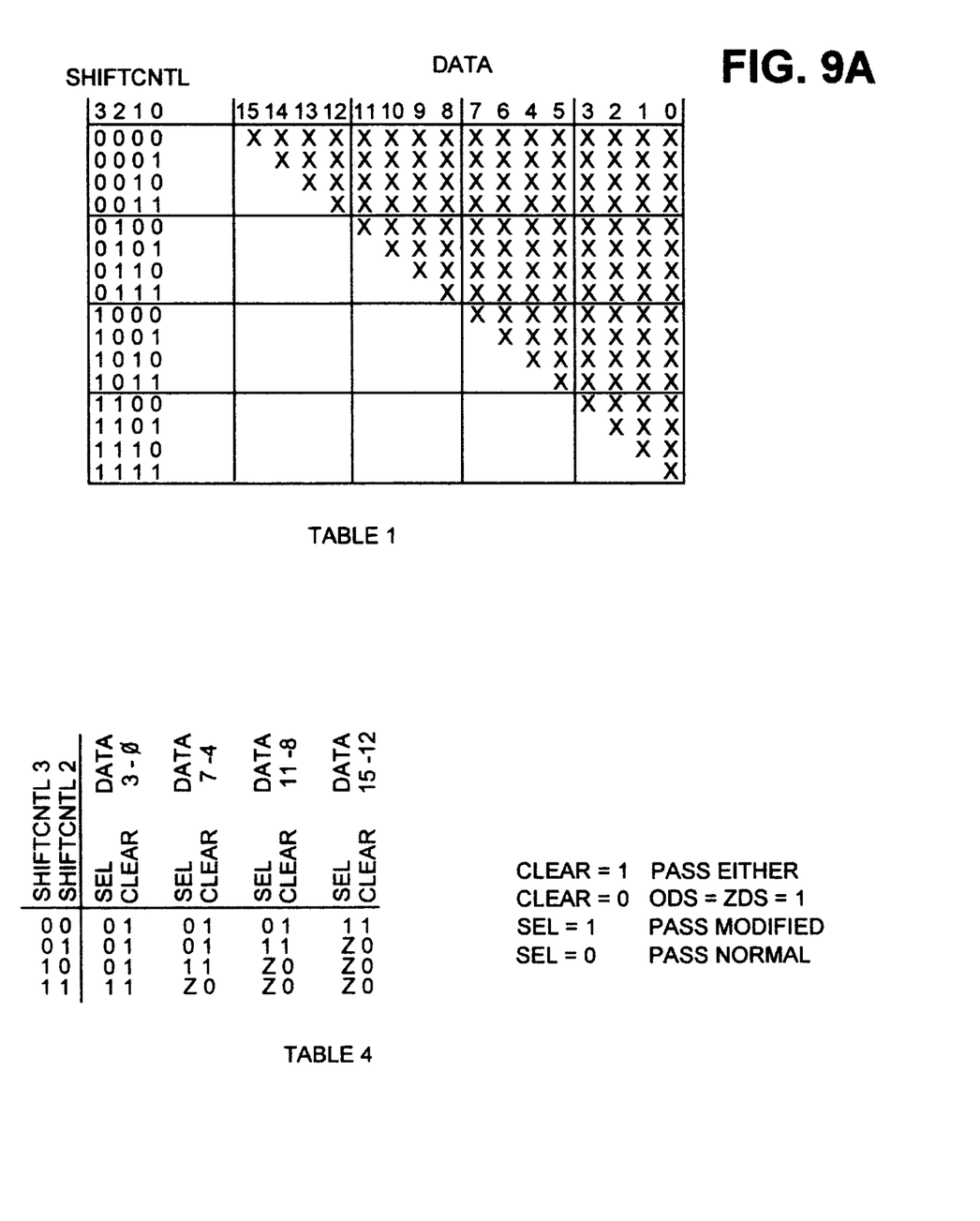
FIGS. 9A and B illustrate truth tables for a control field and the embodiments illustrated in FIGS. 5, 6, and 8.

The control field comprises four shift control (SHIFTCNTL) command lines. Table 1 in FIG. 9 illustrates the control field for each pre-normalized data field. Each "X" represents a bit position in the data field that will remain in the normalized data field. The blank spaces indicate the number of times the data field must be left shifted. For instance, if SHIFTCNTL=0000, the data field will not be left shifted at all, and the entire data field will be in the normalized data field. If, however, SHIFTCNTL=1100, the data field will be left shifted 12 bit positions, and only four bits of the original data field will remain in the normalized data field. Consequently, only the X portion of the data field should be examined for all ones or all zeros.

As shown in Table 1, the data field is divided into four segments corresponding to the four segments shown in FIG. 2. For a given data field, only one segment contains the border between what will be the normalized field, represented by X's, and the leading bits, left blank in the table. For instance, where SHIFTCNTL=0101, the second most significant segment, DATA 11–8, is the border segment. Each segment is provided to the four detectors, 210, 220, 230, and 240 of FIG. 2. For segments to the right of a border segment, referred to herein as lower order segments, selector 250 selects indications from detectors 210 and 220.

Figure 3:
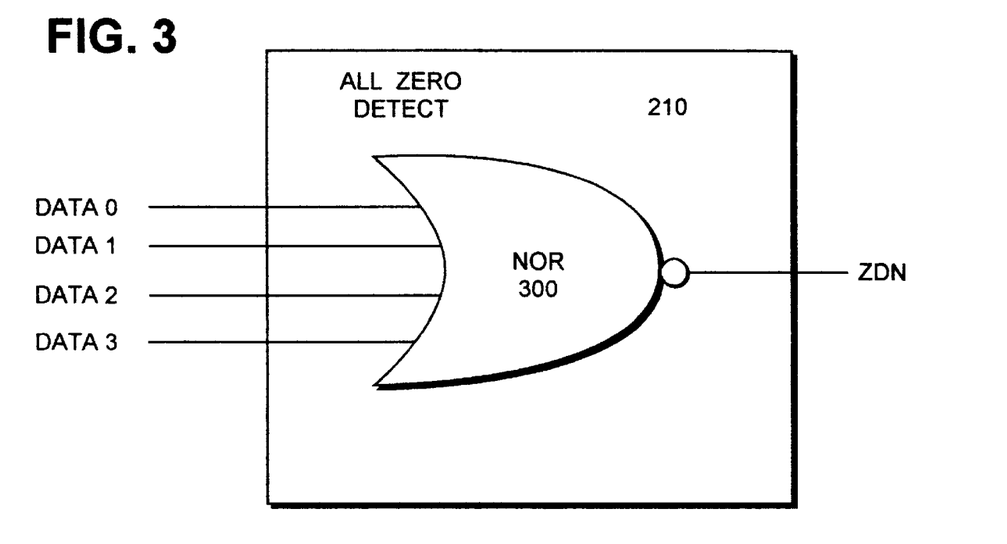
FIG. 3 illustrates one embodiment of a zeros detect unit.

FIG. 3 illustrates one embodiment of a zeros detect unit 210. In the illustrated embodiment, the lowest order segment, data lines DATA 3–0, is provided to a four input NOR gate 300. The output signal, ZDN, is one if and only if all of the data lines DATA 3–0 are zeros.

Figure 4:
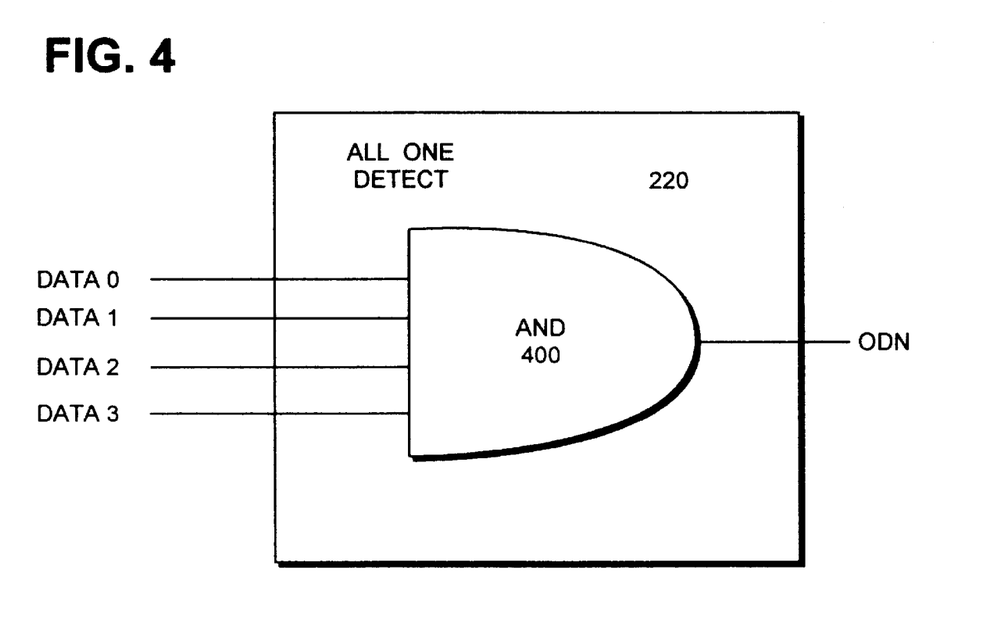
FIG. 4 illustrates one embodiment of a ones detect unit.

FIG. 4 illustrates one embodiment of a ones detect unit 220. In the illustrated embodiment, DATA 3–0 are provided to a four input AND gate 400. The output signal, ODN, is one if and only if all of DATA 3–0 are ones.

Zeros detect unit 210 and ones detect unit 220 are only useful where all four of the input bits will be included in the normalized data field. That is, detectors 210 and 220 are only selected by selector 250 for lower order segments where all four inputs are X's in Table 1. For instance, if SHIFTCNTL= 1101, DATA 3–0 is a border segment. DATA 3 is a leading bit that will be shifted out of the normalized data field. The leading bit may be a zero or one depending on the notation used by the ALU 110. If DATA 3 is zero, the output of ones detect 220 would be a zero even if DATA 2–0 were all ones. Alternately, if DATA 3 is one, the output of zeros detect 210 would be zero even if DATA 2–0 were all zeros. Consequently, detectors 210 and 220 do not provide reliable indications for border segments, so selector 250 does not select them for border segments. To handle border segments, detector 130 includes modified detectors 230 and 240.

Returning to FIG. 2, the two low order bits of the control field, SHIFTCNTL 1 and 0, are inverted by inverters 205 and provided to modified zeros detect 230 and modified ones detect 240. Within a border segment, SHIFTCNTL 1 and 0 define the boundary between the normalized field and the part of the field that will be shifted out. For instance, whenever SHIFTCNTL 1 and 0 are 00, the normalized data field contains whole segments. That is, the border segment includes four X's so the normalized data field will include 4, 8, 12, or 16 X's. Where SHIFTCNTL 1 and 0 are 11, only one bit from a border segment is included in the normalized data field. That is, the normalized data field will include 1, 5, 9, or 13 X's. Therefore, modified detectors 230 and 240 must selectively examine only a portion of the segments, depending on SHIFTCNTL 1 and 0.

Figure 5:
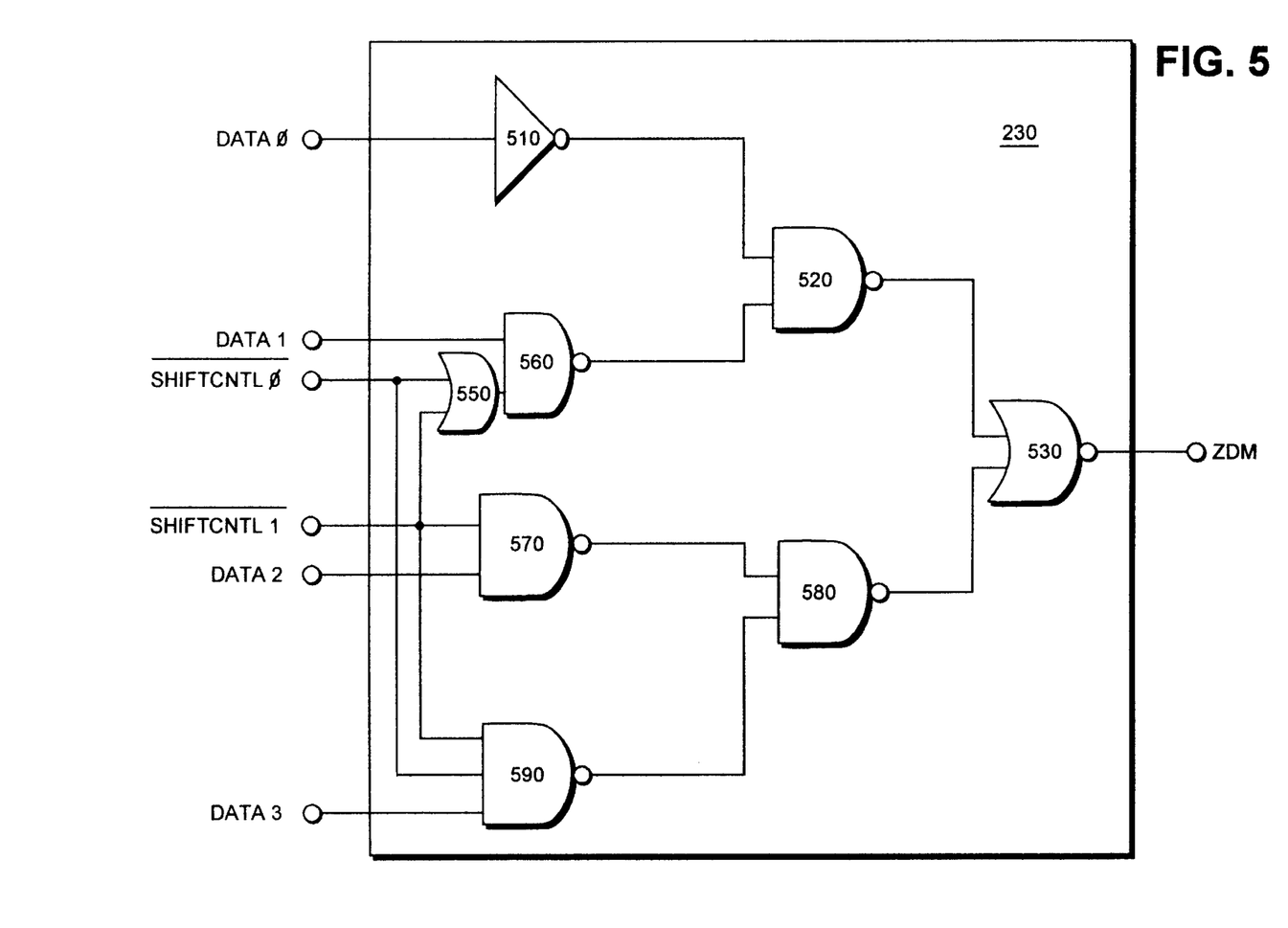
FIG. 5 illustrates one embodiment of a modified zeros detect unit.
Figure 9B:
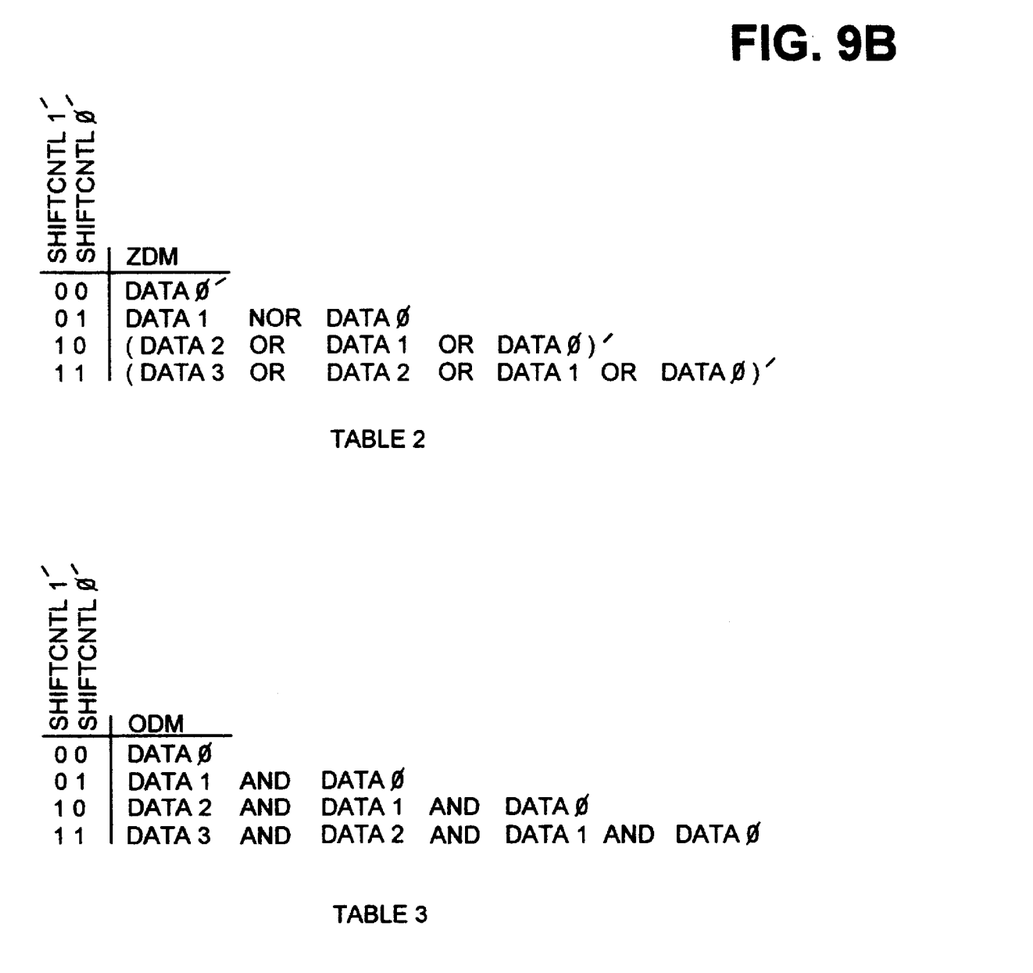

FIG. 5 illustrates one embodiment of modified zeros detect 230, wherein SHIFTCNTL 1 and 0 have already been inverted. As shown, the lowest order segment, DATA 3–0, is provided to modified zeros detect 230. Table 2, in FIG. 9B, illustrates the output, ZDM, in response to inverted SHIFTCNTL 1 and 0. Where inverted SHIFTCNTL 1 and 0 are 00, both inputs of OR 550 are zero, producing a zero on an input of NAND 560. As a result, DATA 1 is masked out, and the output of NAND 560 is forced to one. An input to NAND 570 is zero and two inputs to NAND 590 are zero, so both DATA 2 and DATA 3 are also masked out, and ones are forced on the inputs of NAND 580. As a result, NAND 580 forces a zero input on NOR 530. DATA 0 is inverted by inverter 510, inverted again as it passes through a NAND 520, and inverted a third time as it passes through NOR 530. Therefore, the output ZDM, as shown in table 2, is the inverse of DATA 0.

In general, everywhere that un-inverted SHIFTCNTL 1 and 0 are 11, only the least significant bit of each segment is analyzed for all zeros. As shown in Table 1, this corresponds to the situation in which the border segment includes only one X.

If inverted SHIFTCNTL 1 and 0 are 01, DATA 0 and DATA 1 are not masked, but DATA 2 and DATA 3 are masked. In which case DATA 1 and DATA 0 are NORed. For each higher value of inverted SHIFTCNTL 1 and 0, another data line is unmasked. The output ZDM is one if and only if all of the unmasked data lines are zeros. In this fashion, modified zeros detect 230 performs zeros detection only for the portion of the border segment that will be included in the normalized data field.

Figure 6:
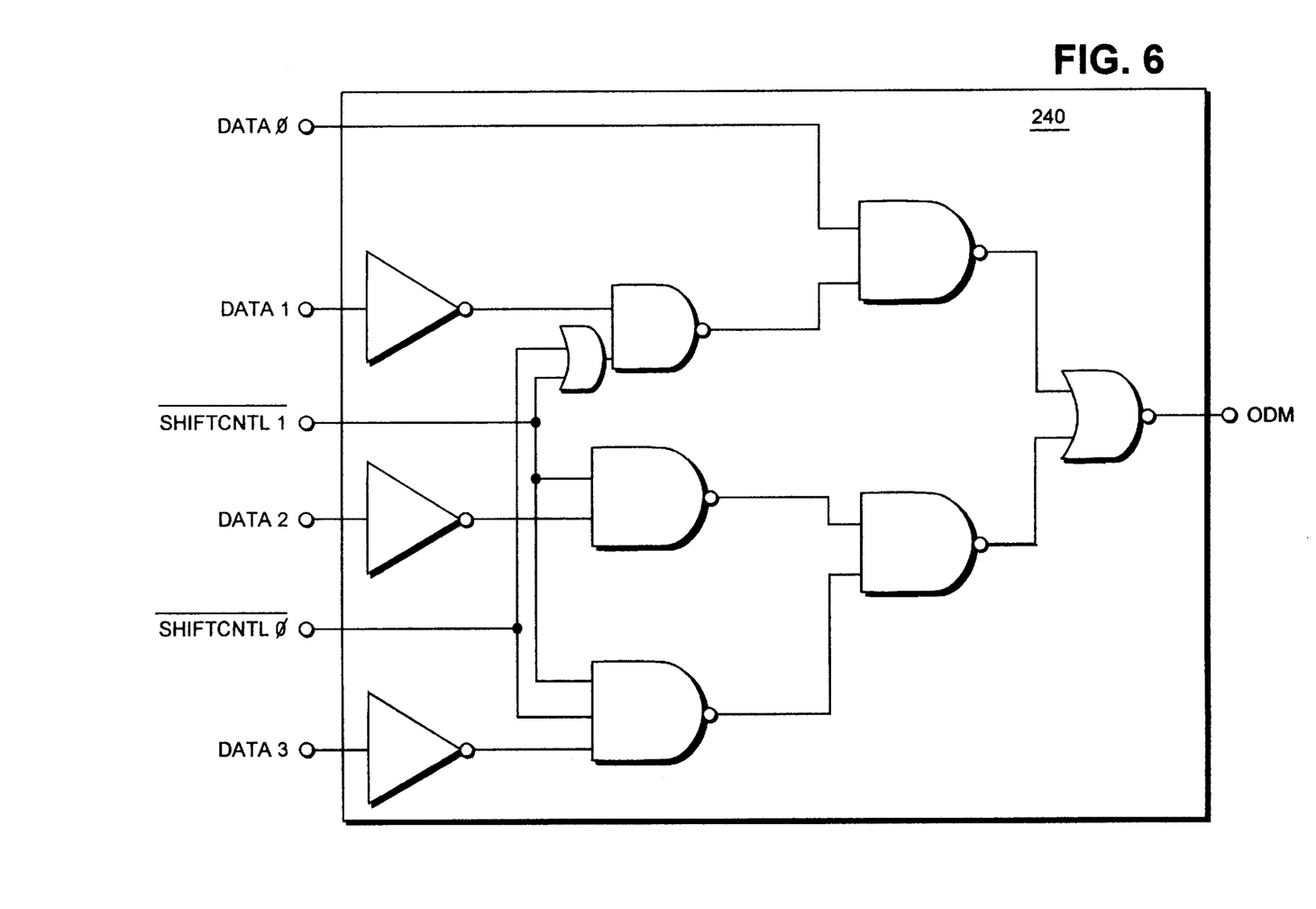
FIG. 6 illustrates one embodiment of a modified ones detect unit.

FIG. 6 illustrates one embodiment of modified ones detect 240, wherein SHIFTCNTL 1 and 0 have already been inverted. As shown, the lowest order segment, DATA 3–0, is provided to modified ones detect 240. Table 3, in FIG. 9B, illustrates the output, ODM, in response to inverted SHIFTCNTL 1 and 0. The illustrated embodiment of modified ones detect 240 is the same as the modified zeros detect 230 shown in FIG. 5, except that the data line inputs are inverted.

Where inverted SHIFTCNTL 1 and 0 are 00, DATA 1–3 are masked out. For each higher value of inverted SHIFTCNTL 1 and 0, another data line is unmasked and ANDed. The output ODM is one if and only if all of the unmasked data lines are ones. In this fashion, modified ones detect 240 performs ones detection only for the portion of the border segment that will be included in the normalized data field.

For segments to the left of border segments in Table 1, referred to herein as higher order segments, no bits are X's. That is, higher order segments will not be in the normalized data field and need not be analyzed for all ones or all zeros. For higher order segments, selector 250 clears the outputs ODS and ZDS to provide a clear responses signal.

Figure 7:
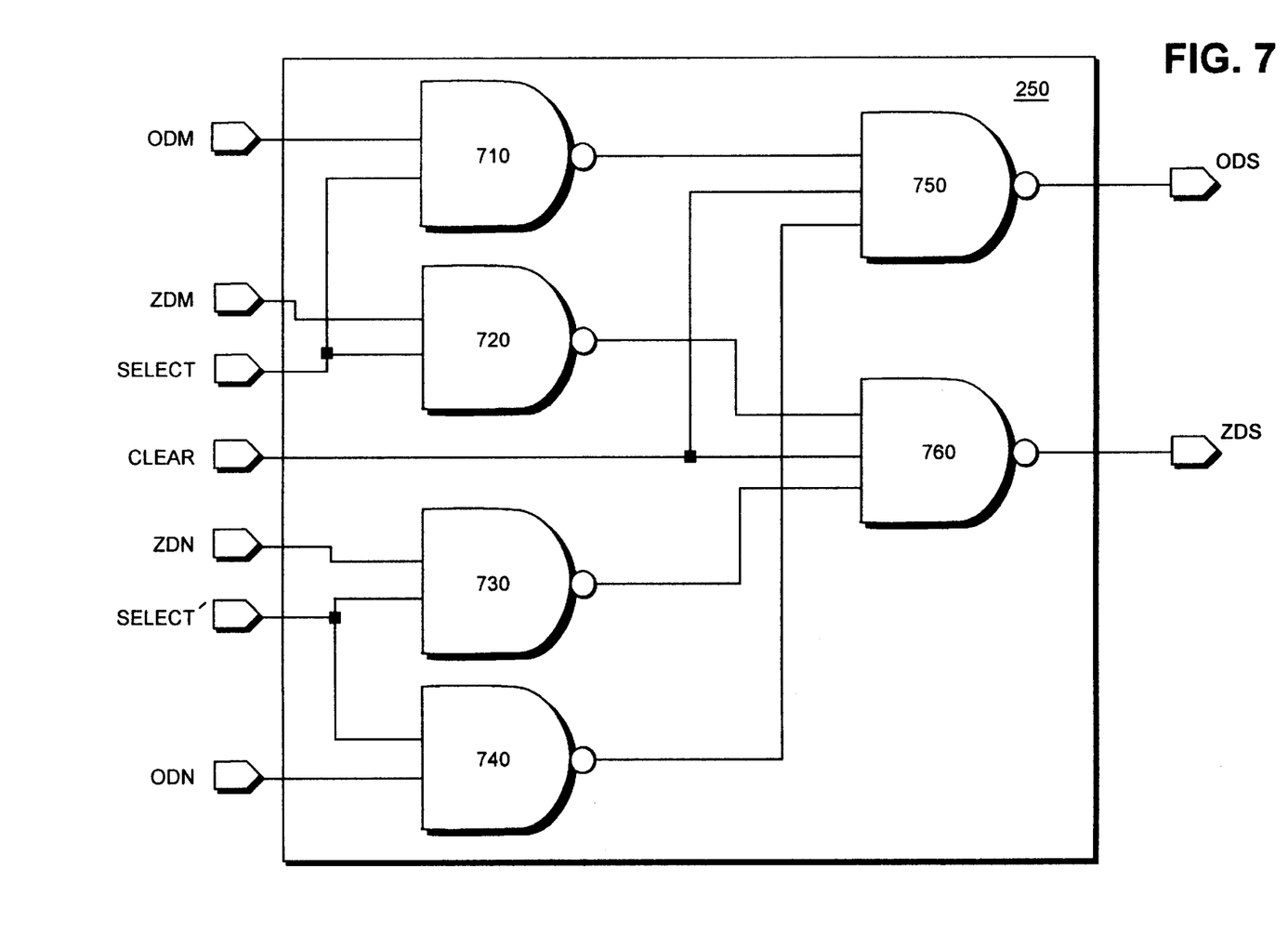
FIG. 7 illustrates one embodiment of a selector.

As shown in FIG. 2, each selector 250 receives a SELECT signal and a CLEAR signal from decoder 260. FIG. 7 illustrates one embodiment of selector 250. When CLEAR is zero, the detector units are all masked out. That is, the outputs of both NAND gates 750 and 760 are forced to one, so both ODS and ZDS are one.

When CLEAR is one, however, the detectors are selectively unmasked. When SELECT is also one, the results from modified detectors 230 and 240 are selected. That is, ODM and ZDM are passed through NANDs 710, 720, 750, and 760, and provided over ODS and ZDS, while ODN and ZDN are masked out by NANDs 730 and 740. When CLEAR is one and SELECT is zero, the results from the unmodified detectors 210 and 220 are selected. That is, ODN and ZDN are passed through NANDs 730, 740, 750, and 760, and provided over ODS and ZDS, while ODM and ZDM are masked out by NANDs 710 and 720.

As shown in Table 4 of FIG. 9A, the values of SELECT and CLEAR are decoded by decoder 260 for each segment in the data field based on SHIFTCNTL 3 and 2. For higher order segments which do not include any X's, decoder 260 sets the CLEAR signal to zero, so that ZDS and ODS are forced to one. The ones are provided to ANDs 260 and 270 so that the ZDSs and ODSs from the lower order segments are passed. For the border segments, decoder 260 sets CLEAR to one and SELECT to one, so that ODM and ZDM are selected and provided to ANDs 260 and 270. Similarly, decoder 260 sets CLEAR to one and SELECT to zero for the lower order segments, so that ODN and ZDN are passed to ANDs 260 and 270.

Figure 8:
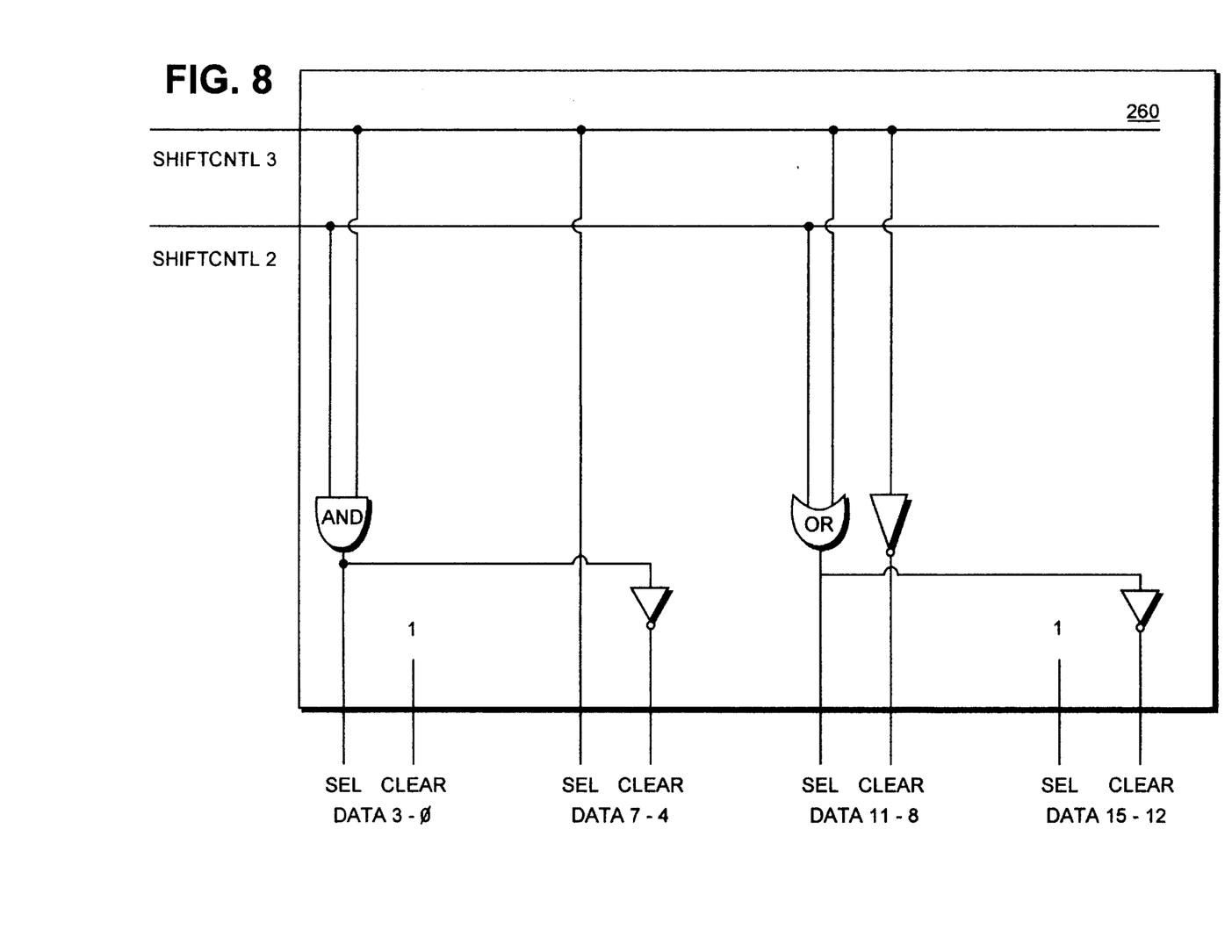
FIG. 8 illustrates one embodiment of a decoder.

In Table 4, "Z" represents an "any" value. That is, where CLEAR is zero, SELECT can be any value because both outputs of selector 250 are forced to one. FIG. 8 illustrates one embodiment of decoder 260. In FIG. 8, CLEAR is always one for segment DATA 3–0, and SELECT is SHIFTCNTL 3 AND SHIFTCNTL 2. For segment DATA 7–4, SELECT is tied to SHIFTCNTL 3 and CLEAR is the inverse of CLEAR for DATA 3–0. For segment DATA 11–8, CLEAR is the inverse of SHIFTCNTL 3 and SELECT is SHIFTCNTL 2 OR SHIFTCNTL 3. Alternately, SELECT could be tied directly to SHIFTCNTL 2, although an OR is still needed for CLEAR in segment DATA 15–12. For segment DATA 15–12, SELECT is always one, and CLEAR is SHIFTCNTL 2 NOR SHIFTCNTL 3.

Figure 10:
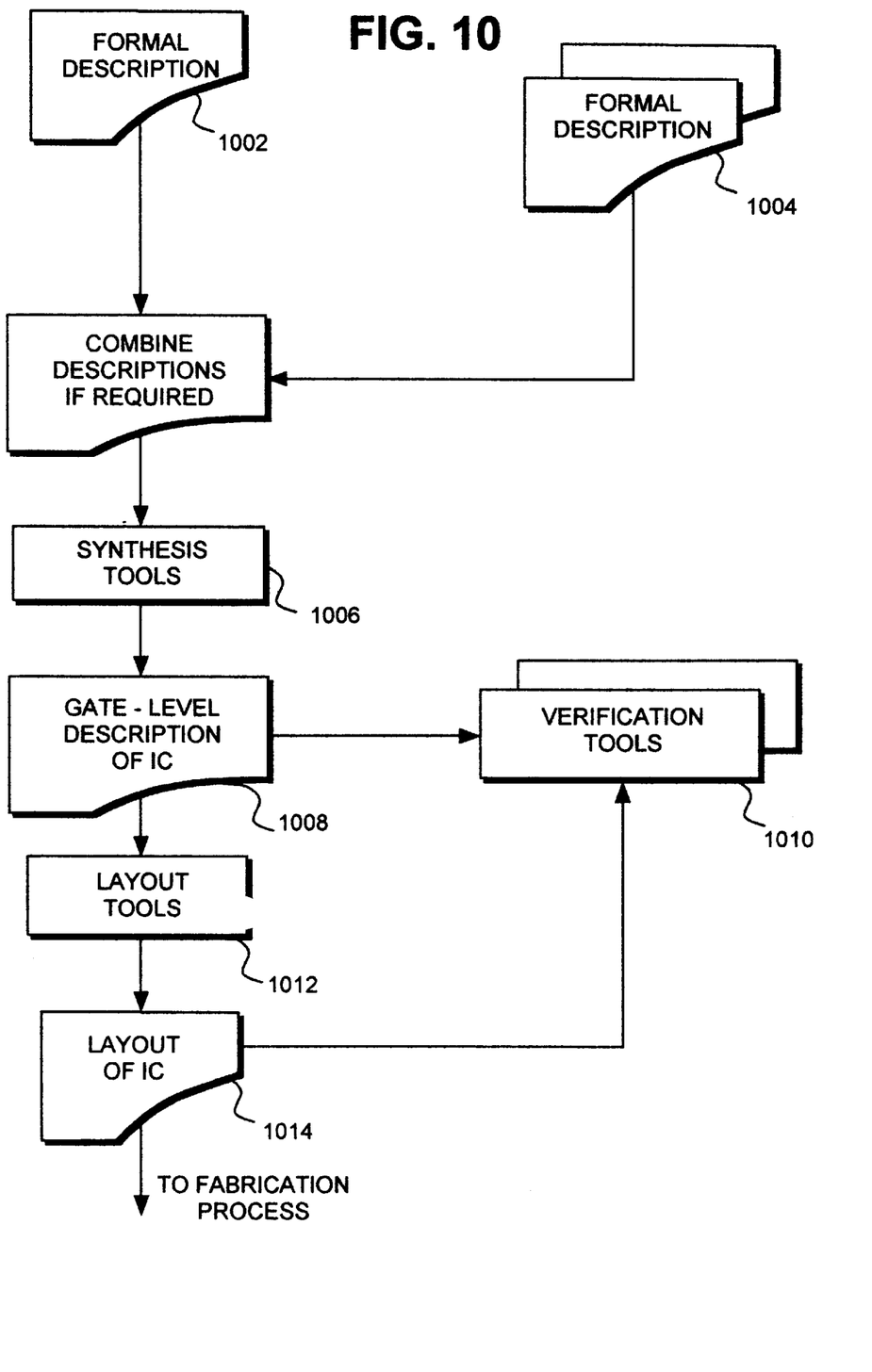
FIG. 10 illustrates one embodiment of a design process incorporating the present invention.

Turning now to FIG. 10, a block diagram is shown illustrating one embodiment of a design process for designing an integrated circuit (IC) incorporating the innovative features of zeros/ones detector 130. As illustrated, a formal description 1002 of the zeros/ones detector is prepared. Formal description 1002 may be prepared in any one of the formal IC description languages known in the art, such as Very High Speed Integrated Circuit (VHSIC) Description Language, or VHDL, Verilog, and the like, using any one of a number of know design description editors supporting the desired formal description language.

Formal description 1002 is then optionally merged with formal descriptions 1004 of other function blocks of the IC, if the zeros/ones detector is to be fabricated as an integral part of a "larger" IC. Formal description 1002, or the merged formal descriptions of 1002 and 1004, are then provided to synthesis tools 1006 to synthesize, i.e. to generate, a gate-level description 1008 of the IC to be fabricated. Formal descriptor 1002 is provided to synthesis tools 1006 in a manner that allows the special design of the zeros/ones detectors of the present invention to be directly incorporated into gate-level description 1008, substituting for conventional implementations that would have been otherwise synthesized for the individual zeros/ones detector portions by synthesis tools 1006. The gate-level description 1008 may then be used by a number of verification tools 1010, such as simulators or emulators, to verify the correctness of the design. An example of a verification tool is the SimExpress™ emulator product manufactured by Meta System of Sacley, France, a wholly owned subsidiary of the assignee of the present invention.

Upon verification, or in parallel, gate-level description 1008 of the IC is then provided to layout tools 1012 to generate physical layout description 1014 of the IC. Layout description 1014 is also subjected to verification by layout level ones of verification tools 1010. An example of layout level verification is parasitic analysis for submicron level integration. Upon verification, layout description 1014 of the IC is then provided to the fabrication process to fabricate the desired IC.

Those skilled in the art will appreciate that the design process and the fabrication process may be performed by different parties. In fact, the creation of formal description 1002 may be performed by a party independent of the party or parties who prepare formal descriptions 1004 for the other function blocks, and/or the party or parties who perform the synthesis, verifications, etc. Formal description 1002 may be provided to these other parties via any one of a number of known data transfer methods, e.g. through a removable storage medium such as magnetic tape, compact disk (CD), digital versatile disk (DVD), and the like, or through networked data communication links. In this context, formal description 1002 is often referred to as a "soft core."

Figure 11:
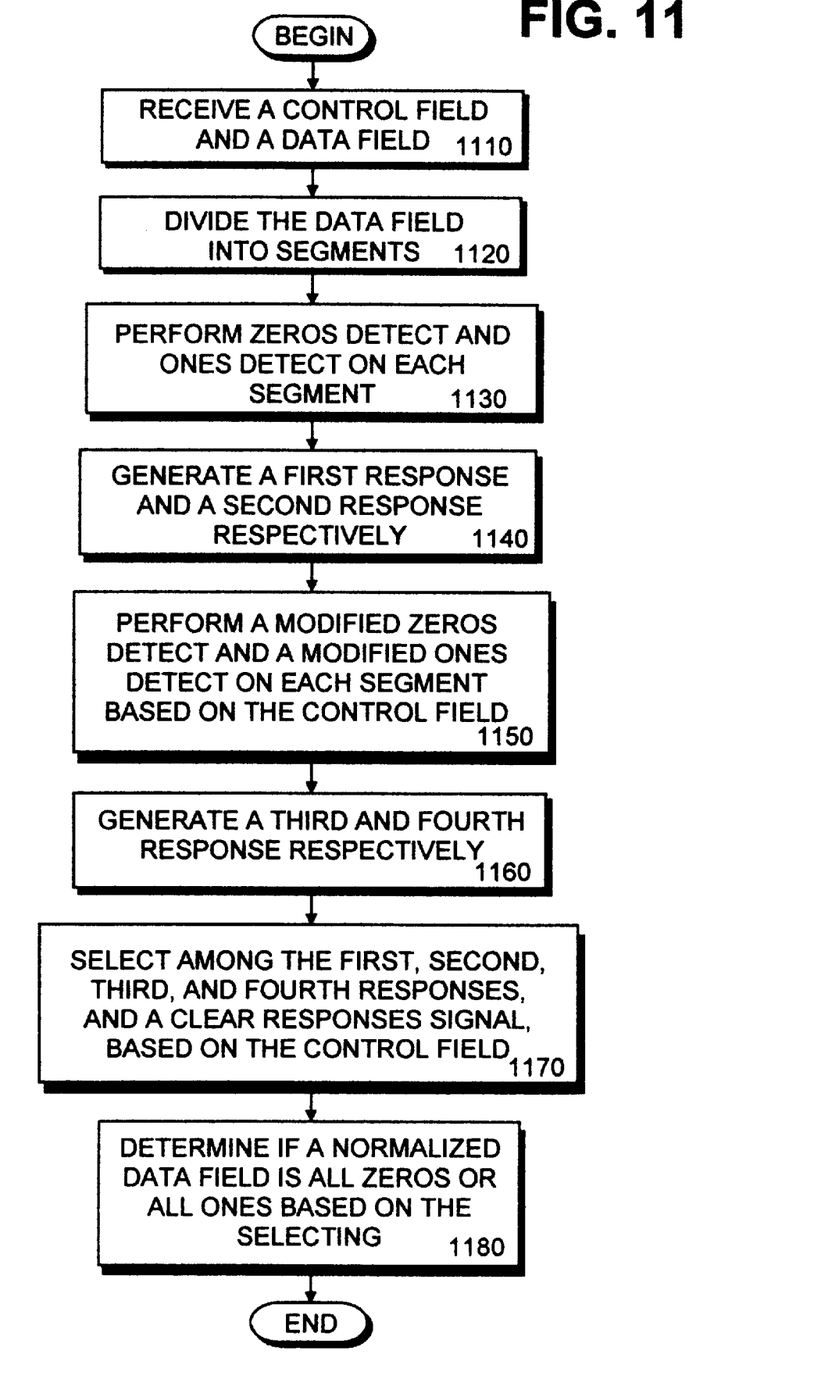
FIG. 11 is a flow chart summarizing one embodiment of the present invention.

FIG. 11 is flow chart summarizing the process of zeros/ones detector 130. In block 1110, detector 130 receives a control field and a data field. Detector 130 divides the data field into segments in block 1120. For each segment, detector 130 performs a zeros detect and a ones detect in block 1130. From the detections, in block 1140, detector 130 generates a first and second response for each segment. In block 1150, detector 130 performs a modified zeros detect and a modified ones detect on each segment based on the control field, and in block 1160 generates a third and forth response for each segment. Then, in block 1170, detector 130 selects from among the first, second, third, and forth responses, and a clear response signal based on the control field. In block 1180, based on the selection made in block 1170, detector 130 determines if a normalized data field is all zeros or all ones.

In certain embodiments, the most significant one is "hidden." That is, a normalized floating point number always has a one in the most significant bit position of the mantissa, so it is redundant to show the most significant one in the normalized data field. Those skilled in the art, after having read the foregoing, will recognize that the teachings of the present invention can likewise be applied to a "hidden" one floating point number.

In alternate embodiments, the data field can be wider or narrower, and the control field, the number of segments, and the width of each segment can larger or smaller depending on the width of the data field. Those skilled in the art, after having read the forgoing, will recognize that the teachings of the present invention can likewise be applied to larger or smaller data fields. For instance, a 32 bit data field can be accommodated using a five bit control field, and eight four bit segments.

In alternate embodiments, various additional methods can be used to detect all zeros and all ones in addition to those shown in FIGS. 3 and 4, wherein the number of input lines depends on the width of the data field and the number of segments in the data field.

In alternate embodiments, decoder 260 can control more or less selectors 250, depending on the width of the data field and the number of segments in the data field. Also, the outputs of ones/zeros detector 130 can be coupled to left shifter 140 so that the output of left shifter 140 can be forced to all zeros or all ones accordingly, without waiting for the shifted output.

Those skilled in the art, after having read the foregoing, will recognize that the present invention can also be used for right shifting, and is not limited to left shifting.

Thus, an improved method and apparatus to detect a floating point mantissa of all zeros or all ones is described. Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

What is claimed is:

1. A method comprising:

receiving a control field and a data field;

dividing the data field into segments;

performing an all zeros detect and an all ones detect on each segment to generate a first response and a second response respectively for each segment;

performing a modified zeros detect and a modified ones detect on each segment, based on the control field, to generate a third response and a forth response respectively for each segment;

selecting among the first, second, third, and forth responses, and a clear response signal, for each segment, based on the control field; and determining if a normalized data field is all zeros or all ones based on the selecting.

2. The method of claim 1 wherein the control field indicates a number of bit positions to shift the data field to produce the normalized data field.

3. The method of claim 1 wherein each segment is four bits and the data field is divisible by four.

4. The method of claim 1 wherein the all zeros detect comprises NORing all bits of a particular segment, wherein the first response is a one if all the bits are zero, and the first response is a zero if not all the bits are zero; and wherein the all ones detect comprises ANDing all bits of a particular segment, wherein the second response is a one if all the bits are one, and the second response is a zero if not all the bits are one.

5. The method of claim 1 wherein the modified all zeros detect comprises:

selectively NORing bits of a particular segment starting from a least significant bit and including additional bits based on least significant bits of the control field, wherein the third response is one if all the NORed bits are zero, and the third response is zero if less than all the NORed bits are zero.

6. The method of claim 5 wherein the least significant bits of the control field are two least significant bits, the particular segment is four bits wide, and bits of the particular segment are selected and NORed in an inverse order of the two least significant bits of the control field.

7. The method of claim 1 wherein the modified all ones detect comprises:

selectively ANDing bits of a particular segment starting from a least significant bit and including additional bits based on least significant bits of the control field, wherein the forth response is one if all the ANDed bits are one, and the forth response is zero if less than all the ANDed bits are one.

8. The method of claim 7 wherein the least significant bits of the control field are two least significant bits, the particular segment is four bits wide, and bits of the particular segment are selected and ANDed in an inverse order of the two least significant bits of the control field.

9. The method of claim 1 wherein the selecting is based on most significant bits of the control field, wherein the most significant bits indicate a particular segment, wherein the clear response signal is selected for each that is a more significant segment than the particular segment, the first response and the second response are selected for each segment that is a less significant segment than the particular segment, and the third response and the forth response are selected for the particular segment.

10. The method of claim 1 wherein the determining comprises:
  producing an all zeros signal if the selected first, third, and clear responses for the segments are asserted; and
  producing an all ones signal if the selected second, forth, and clear responses for the segments are asserted.

11. A machine-readable storage medium having stored thereon formal descriptions describing a zero/one detector to receive a data field and a control field and to determine if a normalized data field is all zeros or all ones, wherein when synthesized said formal descriptions yield a gate-level description of an integrated circuit including:
  a plurality of zero/one detect units, each zero/one detect unit to receive one segment of the data field, detect if the segment is all zeros, detect if the segment is all ones, and generate a first response and a second response respectively;
  a plurality of modified zero/one detect units, each modified zero/one detect unit to receive one segment of the data field, identify a portion of the segment based on the control field, detect if the portion of the segment is all zeros, detect if the portion of the segment is all ones, and generate a third response and a forth response respectively;
  a selector, coupled to the plurality of zero/one detect units and the plurality of modified zero/one detect units, to select among the first, second, third, and forth responses, and a clear response signal, for each segment of the data field, based on the control field; and
  an output unit, coupled to the selector, to produce an all zeros signal and an all ones signal based on the responses and signals selected by the selector.

12. The machine readable storage medium of claim 11 wherein the formal descriptions are in a hardware description language (HDL).

13. The machine readable storage medium of claim 12 wherein the HDL is one of Very High Speed Integrated Circuit (VHSIC) Description Language (VHDL) and Verilog.

14. An integrated circuit (IC) including a parallel zero/one detector to receive a data field and a control field and to determine if a normalized data field is all zeros or all ones, the IC created by a process comprising:
  (a) combining formal descriptions describing the parallel zero/one detector with formal descriptions of at least one other function block of the IC to produce a combined formal description of the IC;
  (b) synthesizing the combined formal description to generate a gate-level description of the IC; and
  (c) fabricating the IC including the parallel zero/one detector based, at least in part, on the gate-level description of the IC synthesized from the combined formal description.

15. The IC created by the process of claim 14, wherein the formal description is a machine readable hardware description language (HDL).

16. The IC created by the process of claim 14 wherein the formal description of the at least one additional function block of the IC describes at least one of a processor, a controller, and a digital signal processor (DSP).

17. An apparatus comprising:
  a zero/one detector to receive a data field and a control field and to determine if a normalized data field is all zeros or all ones, said zero/one detector including:
  a plurality of zero/one detect units, each zero/one detect unit to receive one segment of the data field, detect if the segment is all zeros, detect if the segment is all ones, and generate a first response and a second response respectively;
  a plurality of modified zero/one detect units, each modified zero/one detect unit to receive one segment of the data field, identify a portion of the segment based on the control field, detect if the portion of the segment is all zeros, detect if the portion of the segment is all ones, and generate a third response and a forth response respectively;
  a selector, coupled to the plurality of zero/one detect units and the plurality of modified zero/one detect units, to select among the first, second, third, and forth responses, and a clear response signal, for each segment of the data field, based on the control field; and
  an output unit, coupled to the selector, to produce an all zeros signal and an all ones signal based on the responses and signals selected by the selector.

18. The apparatus of claim 17 wherein the zero/one detector is in parallel with a shifter, wherein the shifter normalizes the data field.

* * * * *